United States Patent [19]

Old

[11] 4,181,181

[45] Jan. 1, 1980

[54] TRACTOR IMPLEMENT HITCH WITH RUBBING SURFACES TO LIMIT SWAY

[75] Inventor: John L. Old, Kenilworth, England

[73] Assignee: Massey-Ferguson Inc., Detroit, Mich.

[21] Appl. No.: 853,783

[22] Filed: Nov. 21, 1977

[51] Int. Cl.$^2$ .................. A01B 59/041; A01B 59/048
[52] U.S. Cl. .................. 172/443; 172/273; 172/276; 172/450; 280/474; 280/481
[58] Field of Search ............... 172/276, 439, 443, 446, 172/450, 457, 677, 679, 273; 280/446 A, 456 R, 456 A, 460 R, 460 A, 461 A, 474, 481

[56] References Cited

U.S. PATENT DOCUMENTS

| | | | |
|---|---|---|---|
| 2,608,924 | 9/1952 | Bywater et al. | 172/276 |
| 2,609,741 | 9/1952 | Evenson | 172/276 |
| 2,698,564 | 1/1955 | Sawyer | 280/461 A |
| 2,935,145 | 5/1960 | DuShane et al. | 172/450 X |
| 2,935,147 | 5/1960 | Edman et al. | 172/450 |
| 2,987,126 | 6/1961 | Horney | 172/450 |
| 3,090,639 | 5/1963 | Virtue et al. | 280/474 |
| 3,145,781 | 8/1964 | Rogler | 172/276 |
| 3,910,355 | 10/1975 | Elfes et al. | 172/450 |
| 4,065,009 | 12/1977 | Old | 214/131 A |

OTHER PUBLICATIONS

"Intrac System 2000", Jun. 1972.
*Deutz Schlepper Post* 2-72, "Intrac System 2000 Information", Jun. 1972.
*Macchine e Motori Agricoli*, Jul. 1972, pp. VII/75 to VII/84.
*Fendt Favorit* 611S *Turbomatik*, "Many Options for Your Tractor", p. 7, Dec., 1976.

*Primary Examiner*—Richard T. Stouffer
*Attorney, Agent, or Firm*—John C. Thompson

[57] ABSTRACT

A three-point implement hitch employed to secure an implement forwardly of a propelling tractor. The implement hitch includes a frame on which a pair of forwardly extending lower links are mounted for lateral adjustment. An intermediate portion of each of the lower links may contact a rub block on the hitch frame. The forward ends of each of the lower links rotatably carries an apertured ball which is disposed about a hitch pin on an implement and is secured in place by a lynchpin. When the rearward ends of the lower links are adjusted towards each other and mid-portion of each of the lower links is moved adjacent its associated rub block thus stabilizing the implement and controlling side to side sway. The implement hitch frame can be readily attached to and detached from a tractor.

8 Claims, 5 Drawing Figures

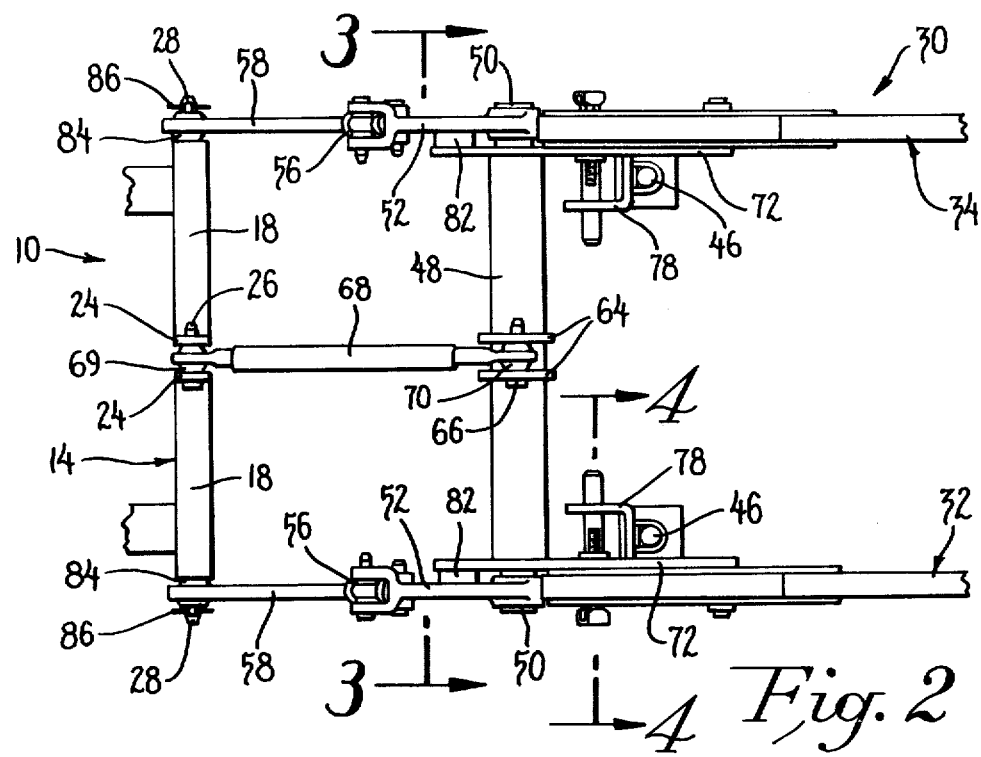

TRACTOR IMPLEMENT HITCH WITH RUBBING SURFACES TO LIMIT SWAY

FIELD OF THE INVENTION

The present invention relates generally to an implement hitch, and more particularly to an implement for securing an implement forwardly of a propelling tractor, the implement hitch being of the type generally referred to as a three-point hitch.

BACKGROUND OF THE INVENTION

While three-point implement hitches have been known for a number of years, these hitches have been customarily mounted on the rear of a tractor and the implement is secured to the tractor in trailing relationship. More recently implements have been secured to the front of a tractor by three-point hitches. As will be appreciated by those having ordinary skill in the art, the hitch will function in a manner somewhat differently when applied to the front of a tractor than when applied to the rear of a tractor. Thus, the lower links will be in compression and it will be necessary to maintain the implement substantially directly in front of the tractor. This has been accomplished by stabilizing the lower links. The links may be stabilized in such a manner that some side to side sway or horizontal float is permitted within set limits. Alternatively, all side to side sway may be eliminated. This will depend upon the type of implement supported by the three-point hitch. As a general rule, those implements which engage the ground will be permitted to sway within set limits. Alternatively, those implements which do not engage the ground will not be permitted to sway.

One manner in which the lower links of a front mounted three-point hitch have been stabilized in the past has been to extend a strut from the rear end of one lower link to the forward end of the other lower link. Alternatively, stabilizer chains have been employed. While such devices have performed their intended function in a generally satisfactory manner, it is necessary to provide these devices with adjustment provisions to accommodate the different type of implements referred to in the preceding paragraph. In addition, as the distance between the hitch pins varies from one category of implement to another category of implement, large variations in the length of the struts and stabilizer chains must be provided for in order to accommodate the varying implements. It should be appreciated that such adjustments in length of stabilizer chains and struts may not be easily accomplished. In addition, it may be necessary to disconnect such devices when mounting or removing an implement from the three-point hitch. Furthermore, such devices may interfere with a tractor power takeoff shaft employed to drive an implement mounted on the front three-point hitch.

The prior art three-point hitches have not been of a construction permitting the easy removal of the hitch from the tractor.

OBJECTS AND SUMMARY OF THE PRESENT INVENTION

It is an object of the present invention to provide improved means to stabilize the lower links of a front mounted three-point hitch.

It is a further object of the present invention to provide a three-point hitch construction which can be readily attached to or removed from a tractor.

More particularly, it is an object of the present invention to provide a front mounted three-point hitch characterized by the provision of sway limiting means in the form of blocks which are adapted to be contacted by intermediate portions of the lower links, the rear end of the lower links being mounted on the hitch frame for lateral adjustment, the lower links cooperating with the sway blocks to variably control side to side sway when an implement is mounted on the forward ends of the lower links.

It is an additional object of the present invention to provide a stabilizer construction for a front mounted three-point hitch which will not interfere with a forwardly extending power takeoff shaft.

In accordance with the principles of the present invention a tractor implement hitch is provided which includes a frame having spaced apart arms which can be readily attached to and removed from a tractor. The frame carries a pair of lower links interconnected with the arms. Each of the lower links is provided with front and rear apertured rotatable balls. The forward balls are passed over spaced apart transversely extending hitch pins carried by the implement and are secured in place by lynchpins which pass through the hitch pins immediately adjacent the front balls. The rear balls of the lower links are in turn mounted on mounting pins which may be laterally adjusted. Rub blocks are mounted on the hitch frame between the ends of the lower links. By shifting the mounting pins towards each other, intermediate portions of the lower links may be moved adjacent the rub blocks while the forward balls contact the lynchpins to insure that lateral swaying movement of the mounted implement may be controlled. The foregoing structure will be described in greater detail with reference to the accompanying drawings in which a preferred form of this invention is illustrated.

BRIEF DESCRIPTION OF THE DRAWINGS

FIG. 2 is a plan view of a portion of the tractor implement hitch associated with an implement, but not with a tractor.

FIG. 3 is a front sectional view taken generally along the lines 3—3 of FIG. 2.

FIG. 4 is a front sectional view taken generally along the lines 4—4 in FIG. 2.

FIG. 5 is a sectional view taken along the lines 5—5 in FIG. 1.

DESCRIPTION OF A PREFERRED EMBODIMENT

Figure 1:
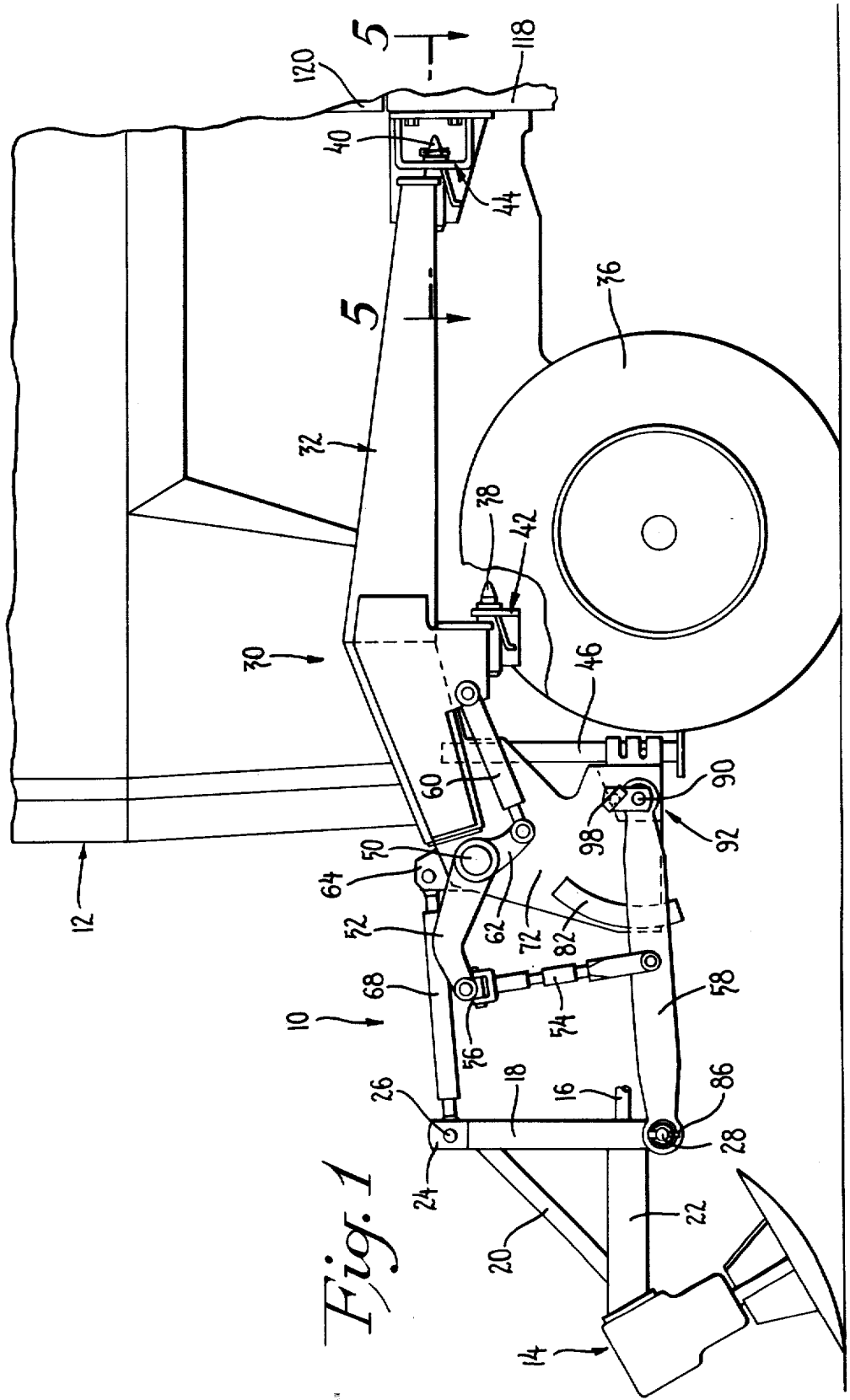
FIG. 1 is a side elevational view of a portion of a tractor on which the tractor implement hitch of this invention has been mounted.

Referring now to FIG. 1, the tractor implement hitch is indicated generally at 10. It is illustrated mounted on the forward portion of a tractor 12, the hitch carrying an implement indicated generally at 14. While a beet topper is shown in FIG. 1, (which beet topper would be driven from a PTO shaft 16), various other implements may be mounted forwardly of a tractor. Such implements may be mounted forwardly of a tractor. Such implements include mowers, rakes, tedders, cultivators, etc.. These implements would be of a type which are adapted to be secured to a three-point hitch and thus, would be provided with a mast 18 and a strut 20, one end of which is supported on the implement frame 22. The mast 18 will be provided with a pair of spaced apart ears 24 which receive a transversely extending pin 26. The implement will also be provided with a crossbar terminating at either end in transversely extending spaced apart hitch pins 28. This construction so far described is generally conventional and is complimentary to the conventional three-point hitch. The farm equipment industry has adopted various standard sizes of three-point hitch implements in which the spacing between the hitch pins will vary as well as various other features. It is a feature of this invention to provide a tractor implement hitch which can be secured to differing category implements having differing spacings between the transversely extending hitch pins.

The tractor implement hitch 10 of this invention includes a support or frame indicated generally at 30. As can best be seen from FIGS. 1 and 2 the support frame includes spaced apart generally parallel longitudinally extending left and right hand legs 32,34, which legs are adapted to be disposed on opposite sides of the forward portion of tractor 12, such legs extending over the axle for the forward wheels 36. Each of the legs, which are formed of box beam sections, is provided with front and rear bayonet mounting pins 38,40, which are adapted to be secured to complimentary mounting portions 42,44 of the tractor. A stand 46 (shown in FIG. 1 in its raised inoperative position) is carried by each of the legs 32,34. The stands are provided to facilitate the mounting of the frame. The mounting of the frame will be discussed in greater detail below.

In addition to the spaced apart legs 32,34 the support 30 is provided with a transverse member in the form of a hollow tube 48, the hollow tube being welded or otherwise rigidly secured to the forward ends of the pair of legs 32,34. A rock shaft 50 extends through the hollow tube 48, the rock shaft being provided with lift arms 52 at either end. The upper ends of a pair of vertically adjustable lift links 54 are connected to the pair of lift arms 52 by universal joint connections indicated generally at 56. The lower end of each of the lift links 54 is secured to an intermediate portion of an associated lower link 58.

An extensible and retractable force applying means in the form of a hydraulic cylinder assembly 60 has its anchor end pivotally secured to one portion of the frame, and its rod end secured to an extension 62 of one of the lift arms 52. It should be obvious that if the cylinder were extended both lift arms 52 would be raised, which in turn acting through the lift links 54 would cause the lower links 58 to be raised.

Mounted upon an intermediate portion of the hollow tube 48 is a pair of upwardly extending ears 64 which receive a transversely extending pin 66. An upper link 68 is provided with front and rear apertured balls 69,70.

The upper link 68 is mounted with the pin 26 passing through the forward ball 69 and the pin 66 passing through the rear ball 70. Such mountings of an upper link can be considered to be conventional.

The frame 30 further includes generally parallel spaced apart members or plates 72 each of which is secured to a forward portion of one of the legs 32,34 and also to the hollow tube 48 by reinforcing plates 74. The lower rear portion of each of the plates 72 is bent into a U-shape having an outer portion 76, an inner portion 78, and a bight portion 80 (FIG. 4). A reinforcing portion 81 is secured to the inner surface of the outer portion 76. The outer surface of each plate supports a rub block 82 which is engageable by an intermediate portion of an associated lower link 58 to limit its sway. Each of the rub blocks or spaced apart devices 82 is disposed between the lift links 54 and the rear end of the lower link 58.

Each of the links 58 is provided with apertured balls rotatably mounted on its front and rear ends. The forward ball 84 is adapted to be positioned over one of the hitch pins 28 and secured in place by a lynchpin 86. The rear ball 88 is mounted on a laterally shiftable pin 90, there being one pin 90 for each of the lower links 58, and each of the pins 90 forming part of one of a pair of spaced apart adjustable mounting means indicated generally at 92. The pin 90 is an extension of a round bar 94 which passes through transversely aligned apertures in the inner and outer portions 76,78 of the U-shaped portion of the plate 72 as well as the reinforcing portion 81. The outer portion 76 and reinforcing portion 81 are also provided with aligned threaded apertures which receive a threaded member in the form of a bolt 96, the bolt being parallel to the pin 90 and bar 94. In the embodiment illustrated, a handle 98 has been welded to the head 100 of the bolt 96. An intermediate member in the form of a strap 102 interconnects the bolt 96 with the pin 90. Thus, one end of the strap 102 is journaled about the bolt 96 but is restrained from outward movement relative thereto by the bolt head 100. The other end of the strap 102 is secured to the outer end of the pin 90 by a roll 104 or comparable securing means. As can be seen from FIG. 4, a shoulder is formed between the pin 90 and bar 94. One side of the ball 88 is disposed adjacent to this shoulder and the other side of the ball 88 is disposed adjacent one side of the strap 102. Thus the ball 88 cannot move relative to the pin 90. As will be obvious from the construction illustrated in FIG. 4 as the handle 98 is rotated in a clockwise direction the strap 102 will be forced toward the portion 76 causing the pin 90 and ball 88 to be shifted inwardly. Alternatively, if the handle 98 is rotated in a counterclockwise direction, the strap 102 will be permitted to shift outwardly along with the ball 88.

When the parts are assembled in the manner illustrated in the various figures, it should be apparent that as the handle 98 is rotated to move the pin 90 towards the center that an intermediate portion of the lower link 58 will be caused to bear against the rub block 82 as outward movement of the forward ball 84 is constrained from such movement by the lynchpin 86. Thus, by adjusting the right and left spaced apart adjusting means towards each other the implement 14 mounted upon the tractor implement hitch of this invention may be secured in such a manner that all side to side sway is eliminated. Alternatively, small or controlled amounts of side to side sway may be permitted. Furthermore, as the forward ends of the lower links can be moved outwardly without affecting the disposition of the adjustable mounting means 92, implements can be readily mounted on the hitch.

To remove the implement from a tractor it is necessary to lower the stands 46 until they engage the ground. The hydraulic lines (not shown) to the cylinder assembly 60 are disconnected, and the lynchpins 106 used to secure the bayonet mounting pins to the mounting portions are removed. The tractor and hitch are then separated by either levering the unit off the tractor, or by backing off the tractor. As the stands are located near the balance point of the hitch, the hitch 10 can easily be parked tilted on the stands 46 and lower links 58. The procedure for attachment is essentially the opposite of detachment. Thus, the bayonet pins will pass through apertures in transverse portion 108 and reinforcing number 109 until the collars 110 about the pins 38 or 40 abut the forward surface of the transverse portion 108 of the mounting portion. The bayonet pin is guided by lower and side guide plates 112,114 which engage a portion of the leg 32,34 adjacent the corresponding bayonet pin. Once the collar 110 is in proper engagement, the bayonet is secured in place by the lynchpin 106, it being customary to employ one lynchpin on each side of the tractor. While only the left rear mounting portion is shown in FIG. 5, it should be obvious that the right rear portion is essentially the same with the side guide 114 disposed between the leg 34 and the tractor 12. The mounting portion 44 is secured by a nut and bolt assembly 116 to that portion of the tractor frame 118 which supports the forward portion of the cab 120. The forward mounting portion 42 corresponds generally to the rear portion 44 and is secured to the tractor 12 in a manner not illustrated.

It is not necessary to remove an implement from the hitch before the hitch is removed. Thus, the tractor implement hitch could be parked on the implement and stands, and the top link could be used to adjust the height of the rear mounting pins.

What is claimed is:

1. A tractor implement hitch capable of mounting implements forwardly of a tractor with limited sway, the implements having a pair of transversely extending hitch pins which may be spaced apart varying distances; the tractor implement hitch being characterized by:

a pair of laterally spaced apart forwardly extending lower links the forward ends of which may be moved vertically and which may also swing from side to side and the rear ends of which include apertured mounting balls;

a pair of laterally spaced apart mounting means associated with the tractor for mounting the rear end of the lower links, the mounting means being capable of adjusting the rear ends of the lower links towards and away from each other; each of said mounting means including a laterally shiftable pin which receives an associated one of said mounting balls, a rotatable threaded member mounted parallel to the laterally shiftable pin, said threaded member passing through a threaded aperture within said hitch, and an interconnecting member interconnecting said pin with the threaded member to effect movement of said pin when said threaded member is rotated relative to the threaded aperture; and a pair of generally vertical extending rubbing surfaces associated with the tractor for abutment with an intermediate portion of the lower links to limit the sway of the lower links.

2. A tractor implement hitch capable of mounting an implement forward of a forwardly moving tractor, the implement having a pair of transversely extending hitch pins which may be spaced apart varying distances; the tractor implement hitch being characterized by:

a pair of laterally spaced apart forwardly extending lower compression links, the forward ends of which may be moved vertically and which may also swing from side to side, a pair of generally vertical extending rubbing surfaces associated with the tractor for abutment with an intermediate portion of the lower links to limit the sway of the lower links; and a pair of laterally spaced apart mounting means associated with the tractor for mounting the rear end of the lower links, the mounting means being capable of infinitely adjusting the rear ends of the lower links towards and away from each other and operable to cause the intermediate portions of both of the lower links to be constrained to move into contact with the rubbing surfaces, the contact being of both of said lower links with said rubbing surfaces at the same time, whereby side to side sway of the lower compression links is controlled, thus stabilizing the implement.

3. The tractor implement hitch as claimed in claim 2 further characterized by the provision of a support, the support including a pair of spaced apart generally parallel legs adapted to be disposed on either side of a tractor and secured thereto, and a transverse member adapted to be disposed forwardly of the tractor when said pair of legs is secured to the tractor, said transverse member being interconnected with the forward ends of said pair of legs, said mounting means and said rubbing surfaces being carried on said support.

4. The tractor implement hitch as claimed in claim 3 wherein said transverse member includes a hollow member, said hitch further including a rockshaft passing through the hollow member, a pair of lift arms secured to the ends of the rockshaft, a pair of lift links extending from the pair of lift arms to the lower links, each of the lift links being secured to an associated lower link at a location forwardly of the spaced apart mounting means.

5. The tractor implement hitch as claimed in claim 4 further characterized by the provision of extensible and retractable force applying means extending between one of the pair of legs and one of the lift arms and operable upon extension to cause said lower links to be raised.

6. The tractor implement hitch as claimed in claim 4 in which a pair of spaced apart ears are secured to the hollow member midway between its ends, and also in which an upper link is secured between the spaced apart ears.

7. The tractor implement hitch as claimed in claim 2 further characterized by the provision of a support which includes a pair of generally parallel members disposed between the lower links and in which the vertical rubbing surfaces are rub blocks, there being one of said rub blocks mounted on each of the parallel members in such a position that it may be contacted by an intermediate portion of an associated lower link.

8. The tractor implement hitch as claimed in claim 7 in which each of the lower links includes an apertured mounted ball at the rear end, and in which each of said pair of spaced apart adjustable mounting means includes a laterally shiftable pin which receives an associated mounting ball.

* * * * *